US 6,741,201 B1

(12) United States Patent
De Jongth et al.

(10) Patent No.: US 6,741,201 B1
(45) Date of Patent: May 25, 2004

(54) GROUND PENETRATING RADAR SYSTEM AND METHOD FOR DETECTING AN OBJECT ON OR BELOW A GROUND SURFACE

(75) Inventors: Rene De Jongth, Spykenisse (NL); Alexander Yarovoy, Delft (NL); Alexander Schukin, Moscow (RU)

(73) Assignee: Technische Universiteit Delft, Delft (NL)

( * ) Notice: Subject to any disclaimer, the term of this patent is extended or adjusted under 35 U.S.C. 154(b) by 0 days.

(21) Appl. No.: 10/130,985

(22) PCT Filed: Nov. 24, 2000

(86) PCT No.: PCT/NL00/00861
§ 371 (c)(1),
(2), (4) Date: Oct. 1, 2002

(87) PCT Pub. No.: WO01/38902
PCT Pub. Date: May 31, 2001

(30) Foreign Application Priority Data

Nov. 24, 1999  (NL) .............................................. 1013661

(51) Int. Cl.$^7$ .............................................. G01S 13/89
(52) U.S. Cl. .......................................................... 342/22
(58) Field of Search .............................. 342/22; 367/87; 73/627, 633; 324/330, 337; 702/2

(56) References Cited

U.S. PATENT DOCUMENTS

| 4,168,484 A | | 9/1979 | Wright, Jr. | |
| 4,381,544 A | * | 4/1983 | Stamm | 702/2 |
| 4,502,009 A | | 2/1985 | Rodiere et al. | |
| 5,920,285 A | * | 7/1999 | Benjamin | 342/22 |
| 6,216,540 B1 | * | 4/2001 | Nelson et al. | 73/633 |
| 6,415,666 B1 | * | 7/2002 | Donskoy et al. | 367/87 |

* cited by examiner

Primary Examiner—Ian J. Lobo
(74) Attorney, Agent, or Firm—Young & Thompson

(57) ABSTRACT

Ground penetrating radar system for detecting objects (17) on or below a ground surface (18), comprising at least one transmit antenna (13) having a first foot print (14) at the ground surface, at least one receive antenna (15) having a second foot print (16) at the ground surface, and processing elements (11, 12) connected to the at least one transmit antenna (13) and the at least one receive antenna (15), in which the first (14) and second (16) foot print have different dimensions. The transmit antenna (13) and receive antenna (15) are adapted to improve the detection capability of the ground penetrating radar system (10).

16 Claims, 3 Drawing Sheets

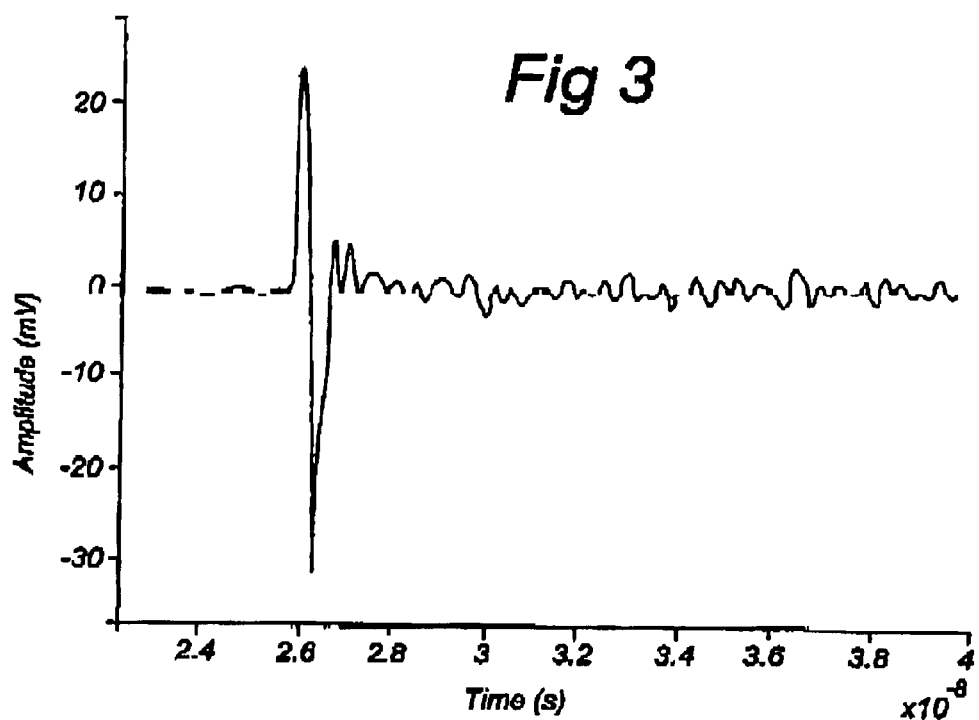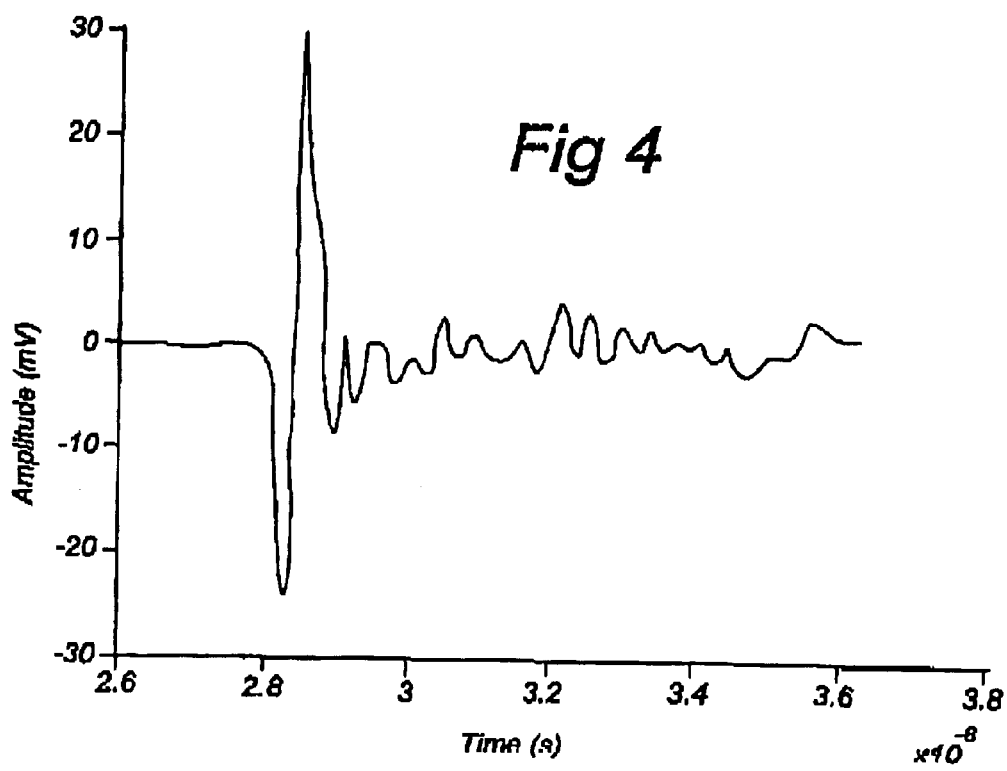

GROUND PENETRATING RADAR SYSTEM AND METHOD FOR DETECTING AN OBJECT ON OR BELOW A GROUND SURFACE

BACKGROUND OF THE INVENTION

The present invention relates to a ground penetrating radar system and method for detecting an object on or buried in the ground. More specifically, the present invention relates to a ground penetrating radar system for detecting objects on or below a ground surface, comprising at least one transmit antenna having a first foot print at the ground surface at least one receive antenna having a second foot print at the ground surface, and processing means connected to the at least one transmit antenna and the at least one receive antenna. Such a system may primarily be used to detect buried mines, both metallic and non-metallic.

DESCRIPTION OF THE RELATED ART

American patent U.S. Pat. No. 5,680,048 describes a mine detecting device using a combination of sensor systems to detect mines dispersed on or buried in the ground. In the system, a combination is used of a ground penetrating radar, a radiometer and a metal detector. The ground penetrating radar comprises processing means and a combined transmit/receive antenna. The transmit and receive antenna may also be separate antennas. In the system disclosed, the transmit antenna is combined with a dielectric lens to generate a collimated beam to obtain a beam with nearly constant power for short distances.

In general, a ground penetrating radar system directs an electromagnetic signal (such as a pulse) by means of the transmit antenna into the ground, and the back scattered signal is received by the receive antenna and useful information regarding objects is extracted from the received signal. When the signal transmitted is of a amplitude, frequency and duration, it is possible to separate useful information from noise. However, when a signal is transmitted with a trailing resonance signal (such as generated by certain shapes of transmit antennas) it is not clear what part of tho back scatter signal contains the useful information.

Ground penetrating radar systems usually operate in the microwave frequency range, and numerous designs of transmit and receive antennas have been developed to overcome specific problems, such as transmission and reception in certain environments, transmitting specific polarisation signals and broad band signals having specific phase and polarisation characteristics.

A problem with the described ground penetrating radar system and other known ground penetrating radar systems is that the resolution and depth of penetration is usually not sufficient to provide adequate operation. Especially in a dielectrically cluttered region environment, the effective application of the ground penetrating radar system might be impaired.

SUMMARY OF THE INVENTION

It is therefore an object of the present invention to provide a ground penetrating radar system with a good performance in detecting objects on or buried in the ground.

This object is achieved by a ground penetrating radar system of the type defined in the preamble, in which the first and second foot print have different dimensions. With foot print at the ground interface, the plan coverage of the antenna on the ground surface is meant. This arrangement will result in reception of a signal, which is significantly reduced in noise, allowing easier processing of the received signal to detect the object on or in the ground.

Preferably, the second foot print is enclosed by the first foot print. This allows illumination by the transmit antenna of a larger area at the ground surface and a very localised sensing of back scattered signals by the receive antenna.

In a further embodiment of the ground penetrating radar system, the at least one transmit antenna is arranged to operate as a far field antenna and the at least one receive antenna is arranged to operate as a near field antenna. Objects on or buried in the ground are illuminated by the transmit antenna, and the back scattered signals are sensed very locally by the receive antenna. Hereby, only back scatter signals will be received from objects in the direct vicinity of the receive antenna, making the back scatter signal less noisy and less polluted with clutter from other objects or material.

In a further embodiment of the ground penetrating radar system the at least one transmitter antenna and the processing mews are arranged to provide a pulse shape with reduced ringing characteristics, The transmit antenna of the present ground penetrating radar system is preferably a TEM horn antenna. In a preferred embodiment, the transmit antenna produces a single-cycle pulse of RF energy directed towards the ground surface. Such a transmit antenna allows generation of a single cycle pulse with a very pure foil, i.e. without a trailing resonance signal. This trailing resonance signal is usually referred to as ring. Transmitting a pure single-cycle pulse without ringing will result in a back scatter signal with much more useful information regarding the object to be detected, as no back scatter signal will be present form the trailing resonance signal. A pure single-cycle pulse will result in a cleaner turn signal, allowing the use of early time event(s) within the radiated waveform e.g. the leading edge of the pulse, as very accurate markers in both the transmitted and received signal. This enables a straightforward subtraction of signals in the time domain and signal calibration functions.

However, it is also possible to obtain a maximum backscatter signal from the buried object with other transmitted pulse shapes. For this, either he processing means, the transmit antenna or both should be adapted. It is e.g. possible to change the transmit horn antenna geometric profile and/or the characteristics of a pulse generator comprised in the processing means It is even possible to use frequency modulated or stopped frequency continuous waveforms for the transmitted signal to be radiated by the at least one transmit antenna. However, as these techniques are acausal synthetic pulse techniques, different radiation mechanisms may be used, and consequently other specific types of transmit antenna Examples of such different types of transmit antenna may be other horn antennae, planar or conic spiral antannae.

In a preferred embodiment, the at least one transmit antenna comprises a first and a second side wall, attached to a connector at a first end, the first and second side wall being at a predetermined and to each other, the first and second side wall each comprising a plural of sections with a predetermined length and a predetermined width, the predetermined width of at least one of the plurality of sections tapering from the side nearest to the first end of the first and second side wall towards the side nearest to a second end of the first and second side wall. This arrangement of the transmit antenna allows generation of a very pure single-cycle pulse.

In a further embodiment, the at least one receive antenna has a low sensitivity. By only sensing the strongest signals, signals are received, which comprise information concerning objects of interest only. Noise in the received signal is reduced, as well as clutter form other objects which are tot of interest. The sensitivity of a receive antenna is the product of the frequency dependence of its effective length and impedance match to the receiver. The sensitivity of the receive antenna is selected such that only local back scattered signal is recovered, as scatter signal from more distant object also illuminated by the transmit antenna is very weak.

Preferably, the at least one receive antenna is a waveguide aperture antenna. Alternatively, the at least one receive antenna is a small loop or short dipole antenna preferably a $\lambda/10$-antenna.

In a further embodiment of the ground penetrating radar system according to the present invention, the at least one receive antenna comprises an additional receive antenna with an additional receive antenna foot print smaller than the transmit antenna foot print. This more directively focused additional antenna has a sensitivity to provide a deeper penetration of the ground, allowing detection of buried objects, which are buried more deeply in the ground. By selecting the proper receiving characteristic of the receive antenna and the additional receive antenna, the region of interest in the ground can be property chosen.

In a still further embodiment, the at least one receive antenna comprises an array of receive antenna. This arrangement allows a mole complex array processing of signals received from each of the receive antennae of the array. Integrating the signals from the multiple near-field receive antennae enables an enhanced focusing, resulting in a better resolution of the image formed from the sub-surface ground and hence a better detectability of buried objects.

The at least one transmit antenna and the at least one receive antenna may be attached to a moving platform. This arrangement allows a continuous scan along the ground while also recording the exact location. Using synthetic aperture radar techniques provides an additional increase in azimuthal and range resolution along the plane of the array directed into the ground.

A second aspect of the present invention relates to a method for detecting an object on or below a ground surface, comprising the steps of illuminating the ground surface with a wide band RF signal, the wide band RF signal being transmitted by a transmit antenna having a first foot print, in which wideband RF signals reflected by the object are probed by at least one receive antenna having a second foot print, the first and second foot print having different dimensions. This method will result in reception of reflected signals, which are significantly reduced in noise, allowing easier processing of the received signal to detect the object on or in the ground.

Preferably, the transmit antenna is being operated in substantially a near field mode and the at least one receive antenna is operated in substantially a near field mode. Objects on or buried in the ground are then illuminated by the transmit antenna, and the back scattered signals are sensed very locally by the receive antenna. Hereby, only back scatter signals will be received from objects in the direct vicinity of the receive antenna, making the back scatter signal less noisy and less polluted with clutter from other objects or material.

In a further embodiment of the present method, the reflected wideband RF signals are probed by a linear array of receive antennae, enabling further signal processing of the received signals to enhance the resolution and detectability.

The wideband RF signal is transmitted substantially as a pulse shape with reduced ringing characteristics, preferably as a single-cycle of RF energy, resulting in a back scatter signal with much more useful information regarding the object to be detected, as no back scatter signal will be present form a trailing resonance signal.

BRIEF DESCRIPTION OF THE DRAWINGS

The ground penetrating radar system according to the present invention will now be discussed in more detail by means of a number of preferred embodiments with reference to the accompanying drawings, in which:

FIG. 3 shows a graphical representation of a short pulse transmitted and received with the transmit antenna according to the present invention;

FIG. 4 shows a graphical representation of a short pulse transmitted by the transmit antenna according to the present invention and received by a B-dot probe;

DESCRIPTION OF THE PREFERRED EMBODIMENTS

Figure 1:
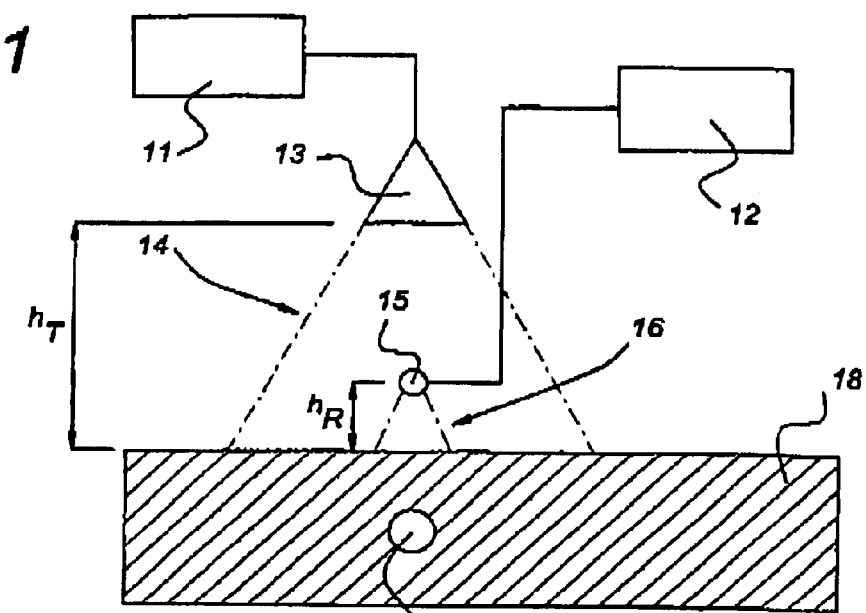
FIG. 1 shows a schematic diagram of a ground penetrating radar system according to a first embodiment of the present invention.

FIG. 1 shows a typical arrangement of the transmit and receive antenna 13, 15 above ground 18 for use in the ground penetrating radar system 10 according to the present invention. The transmit antenna 13 receives a pulse signal from a transmitter 11 and the signal received by the receive antenna 15 is further processed by the receiver 12.

A buried object 17, hidden in the ground 18, is the object to be detected by the ground penetrating radar system. The buried object 17 may be metal, but may also be formed from another material, such as plastic. The buried object 17 may be e.g. a buried plastic mine, which is not detectable by conventional metal detector systems.

Most of the ground penetrating radar systems operate in the microwave frequency region. Antennae capable of transmitting and receiving microwave radiation come in many shapes and designs. Existing antennae for ground penetrating radar systems have addressed problems such as transmission and reception in certain environments, transmitting specific polarisation signals, and broad-band signals having specific phase and polarisation characteristics.

A ground penetrating radar system attempts to gather information from back scatter. Back scatter is reflected signal bounced off objects of interest. When the signal transmitted is of a known a known amplitude, frequency and duration, it is easier to deduce information from the back scatter relating to the composition and shape of the object reflecting the signal, essentially separating useful information from noise. However, when a signal is transmitted with a trailing resonance signal it becomes very difficult to analyse the received back scatter signal, as the accurate amplitude, frequency and duration of the transmitted signal is not precisely known.

For a proper operation of the present ground penetrating radar system, the transmit antenna 13, which is fed by the transmitter subsystem 11, is positioned at a transmitter height $h_T$ above the air-ground interface. This transmitter height $h_T$ is preferably approximately 70 cm. The receive antenna 15, which is coupled to the receiver subsystem 12 for signal processing, is positioned at a receiver height $h_R$ above the air-ground interface. The receiver height $h_R$ is approximately 15 cm.

The antenna foot prints of the transmitter and receive antennae 13, 15 are indicated in FIG. 1 by the dotted lines 14 and 16, respectively. As is clear from FIG. 1, the foot print 14 of tho transmit antenna 13 is substantially bigger than the foot print 16 of the receive antenna 15.

This will result in reception of a signal, which is significantly reduced in noise, allowing easier processing of the received signal.

Figure 2A:
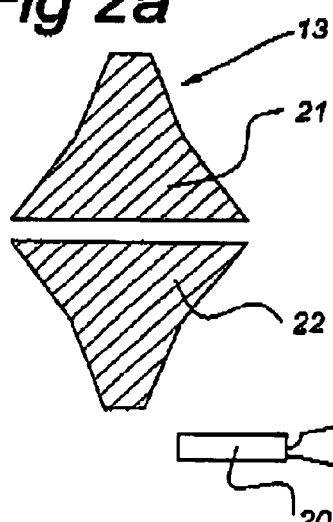
FIGS. 2a–2c a front, side and plan view, respectively of a transmit antenna preferably used in the present ground penetrating radar system.
Figure 2B:
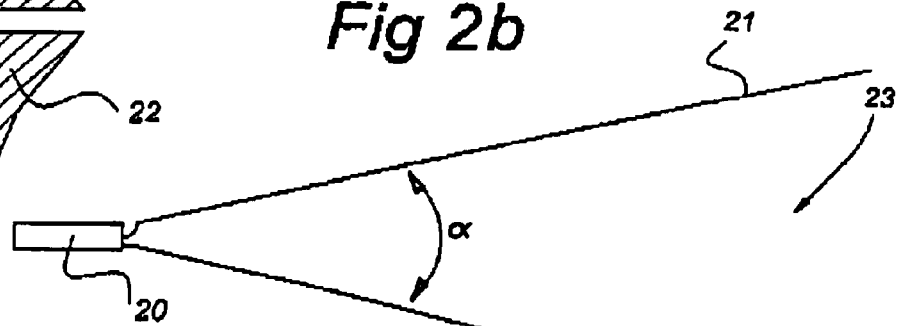
Figure 2C:
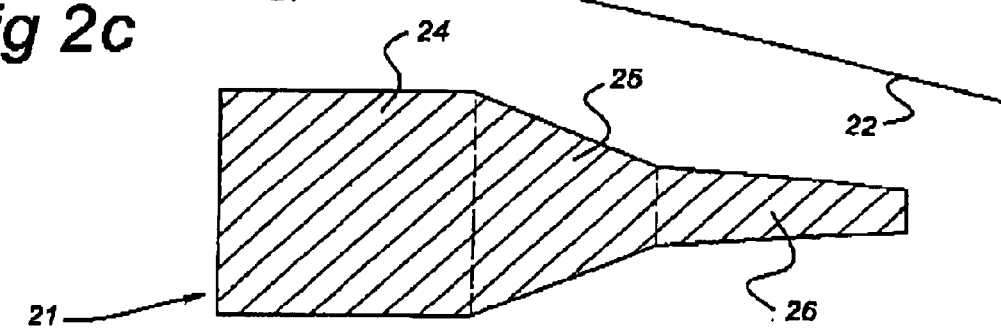

The specific transmit antenna 13 to be preferably used in the present ground penetrating radar system is shown in more detail in FIGS. 2a–2c. FIG. 2a shows a front view of the transmit antenna 13, while FIG. 2b shows a side view and FIG. 2c shows a plan view. As can be seen from FIGS. 2a –2c, the transmit antenna 13 is a specifically shaped TEM horn antenna. The side view in FIG. 2b shows that the transmit antenna 13 comprises two identical shaped parts 21, 22, which are fed by an SMA connector 20. The upper and lower part 21, 22, are at an angle a with respect to each other, which is preferably 20°. When the length of the upper and lower parts 21, 22 is 468 mm, the effective length of the horn antenna 13 (as measured from the feed connector 20 to the aperture surface 23 is equal to 460 mm.

The top view of the transmit antenna 13 shows the specific shape of both the upper and lower part 21, 22, comprising three sections 24, 25, 26. The first section 24, at the connection of the upper and lower part 21, 22 to the feed connector, has a width of preferably 147 mm and a length of preferably 224 mm. The second section 25 has a length of 147 mm and tapers from a width of 147 mm to a width of 44 mm. The third section 26 has a length of 115 mm and its width tapers from 44 mm to 12 mm.

Preferably, the transmit antenna 15 is designed and optimised to have a high radiation efficiency, by precisely matching the impedance and the electromagnetic wave mode of both the transmit antenna 15 and the transmitter subsystem 11. This may be achieved, e.g. by using a balun connected to the SMA connector 20.

A transmit antenna 13 as described allows generation of a single cycle pulse with a very pure form, i.e. without a trailing resonance signal. This trailing resonance signal is usually referred to as ringing. Transmitting a pure single-cycle pulse without ringing will result in a back scatter signal with much more useful information regarding the object to be detected, as no back scatter signal will be present form the trailing resonance signal.

Also, a pure single-cycle pulse will result in a cleaner return signal, allowing the use of early time event(s) within the radiated waveform, e.g. the leading edge of the pulse, as very accurate markers in both the transmitted and received signal. This enables a straightforward subtraction of signals in the time domain and signal calibration functions.

Although the transmit antenna 13 shown is a TEM horn antenna with a wide bandwidth and single polarisation, other antenna types may be used in the ground penetrating system according to the present invention. These other antenna types comprise multiple linear, multiple elliptical and multiple circular polarisation types and these may comprise multiple wide frequency bands.

For the receive antenna 15, an antenna should be chosen with a low sensitivity, thus limiting the sensing capability to "sniffing" the scattered near-field signal in its immediate vicinity. By only sensing the near-field signal, are received, which comprise information concerning objects of interest only. Noise in the received signal is reduced as well as clutter form other objects which arm not of interest, The sensitivity of a receive antenna 15 is the product of the frequency dependence of its effective length and impedance match to the receiver 12. The sensitivity of the receive antenna 15 is selected such that only local back scattered signal is recovered, as scatter signal from more distant object also illuminated by the transmit antenna 13 is very weak.

The receive antenna 15 is preferably an electrically short loop or dipole antenna ($\lambda/10$) such as a B-dot probe. A B-dot probe comprises a full cylinder loop that measures the tune rate-of-change of a magnetic field. Preferably, the probe 15 is provided with a protective cover from a dielectric material. The probe consist of a conducting cylinder which contains four equal-spaced gap structures. The voltage developed across each gap is carried on a 100 ohm biconical transmission line, which at opposite gaps are connected in parallel to 100 ohm cables. These cables are in turn connected to small 50 ohm output cables which allow a transmission to larger cables. The gap and wiring configuration causes any responses to electric field to be cancelled and the sensor's output signal to result from only magnetic fields. A commercially available B-dot probe 15 is e.g. the Prodyn model B-90 sensor. The equivalent area is only $2 \times 10^{-5}$ m$^2$ and the frequency response (3 dB point) is about 10 GHz.

As an alternative, a simple impedance matched B-dot probe antenna may be used as receive antenna 15, which has been previously calibrated over the associated operating frequency band of the ground penetrating radar system 10. The receiver subsystem 11 may comprise e.g. software means to implement a probe compensation for this simple B-dot probe antenna to achieve the desired sensitivity across the required operating band.

Alternatively, a waveguide aperture may be used as receive antenna 15, also with a reduced sensitivity in the frequency region concerned.

As will be known to the person skilled in the art transmitter-receiver arrangements can be reciprocated, i.e. in the present ground penetrating radar system, also a transmit antenna 13 with a narrow angle of foot print can be used, in combination with a receive antenna 15 with a broad foot print.

FIG. 3 shows a graphic illustration of a short pulse transmitted in accordance with the present invention, as measured using two identical TEM horns on boresight FIG. 4 shows a graphic illustration of the pulse transmitted as in FIG. 3, but now as measured with a B-dot probe as receive antenna 15, on boresight with the TEM-horn transmit antenna 13. It can be seen that the pulse transmitted is very short and produces very little trailing resonance signal, thereby being specifically suited in ground penetrating radar applications.

In the present ground penetrating radar system, the probing receive antenna 15 is positioned in front of and along the boresight of the transmit antenna 13, near to the air-ground interface. The receive antenna 13 may be aligned for maximum or minimum field response, the latter option being of interest when collecting data on de-polarised backscatter signals.

Figure 5:
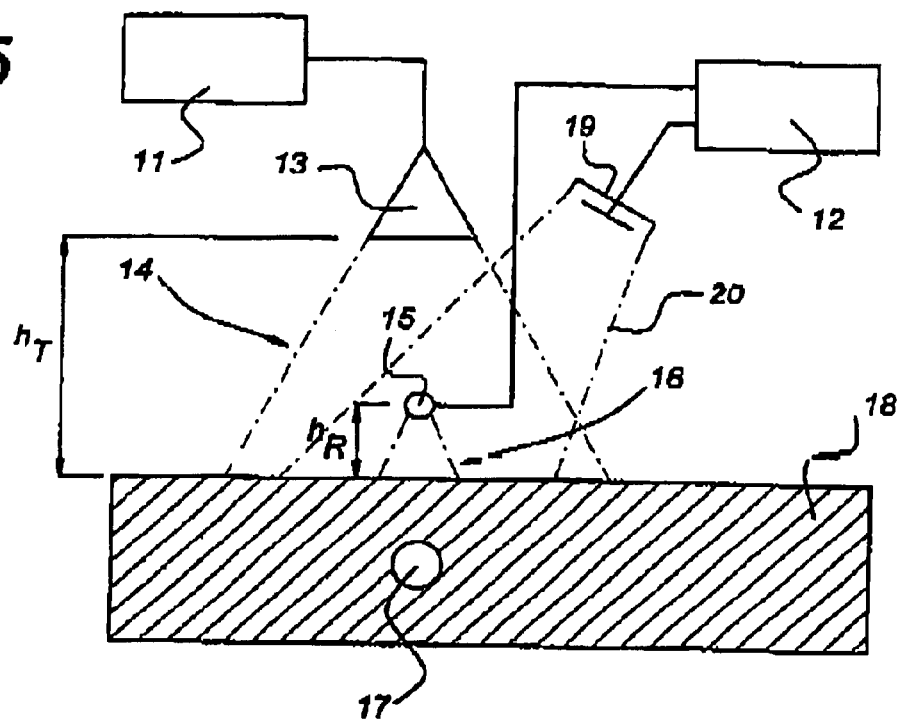
FIG. 5 shows a schematic diagram of a ground penetrating radar system according to a second embodiment of the present invention.

FIG. 5 shows an arrangement of a second embodiment of the ground penetrating radar system according to the present invention. The receiving arrangement is different from the one shown in FIG. 1, in that an additional receive antenna 19 is positioned at a height approximately equal to the transmitter height $h_T$. Both the receive antenna 15 and the additional antenna 19 are connected to a dual channel receiver 18. Preferably, the additional antenna 19 is a dipole antenna in a box, resulting in an additional antenna foot print 20 which is directively focused and has a sensitivity to provide a deeper penetration of the ground 18, allowing detection of buried objects 17, which are buried more deeply in the ground 18.

By selecting the proper receiving characteristics of the receive antenna 15 and the additional receive antenna 19, the region of interest in the ground 18 can be properly chosen.

Figure 6:
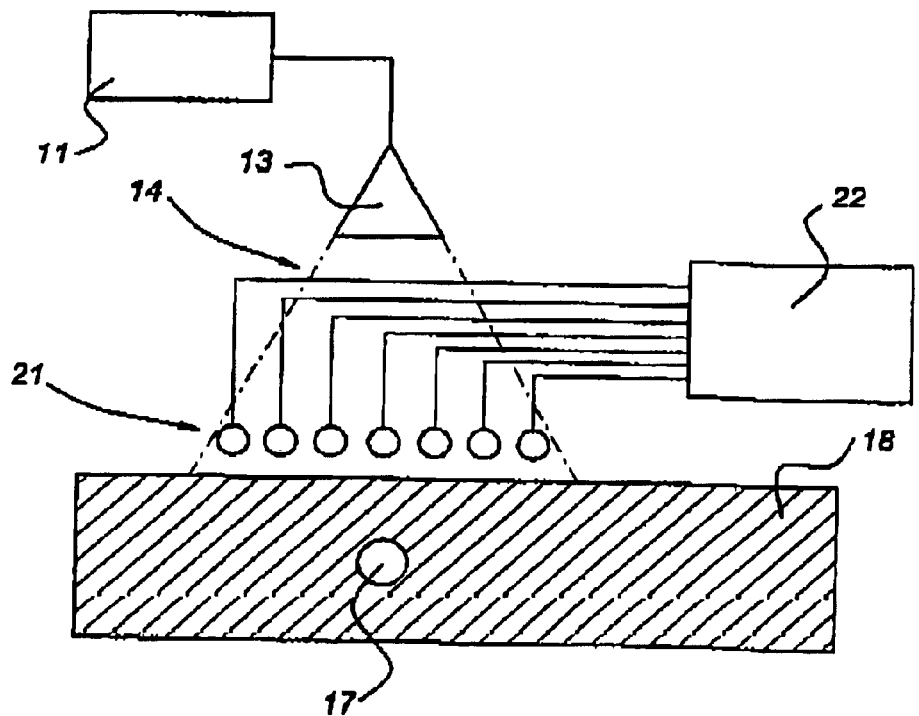
FIG. 6 shows a schematic diagram of a ground penetrating radar system according to a third embodiment of the present invention.

FIG. 6 shows an arrangement of a third embodiment of the ground penetrating radar system according to the preset invention The receiving arrangement is different from the one shown in FIG. 1, in that the receive antenna 15 is replaced by an array 21 of receive antennae, connected to a multi-channel receiver 22. Preferably, the receive antennae of the array 21 are of the same type as the receive antenna 15 used in the other embodiments. The individual receive antennae 15 are set in a frame, constructed from as little metal parts as possible, preferably by using dielectric materials and absorbers. This arrangement allows a more complex array processing of signals received from each of the receive antennae of the array 21. Integrating the signals from the multiple near-field receive antenna 15 enables an enhanced focusing, resulting in a better resolution of the image formed from the sub-surface ground 18 and hence a better detectability of buried objects 17, This transmit and receive array 13, 21 can be attached to a moving platform, enabling a continuous scan along the around 18 while also recording the exact location. Using synthetic aperture radar techniques provides an additional increase in azimuthal and range resolution along the plane of the array directed into the ground 18.

The ground penetrating radar system is described above for a system using temporal pulse generation and transmission. However, the system may also use other techniques such as continuous wave systems (Frequency Modulated Continuous Wave FMCW, and Stepped Frequency Continuous Wave, SFCW) that in essence generate a synthetic temporal pulse.

What is claimed is:

1. Ground penetrating radar system for detecting objects on or below a ground surface, comprising:
    at least one transmit antenna having a first foot print at the ground surface,
    at least one receive antenna having a second foot print at the ground surface, and
    processing means connected to the at least one transmit antenna and the at least one receive antenna,
    the first foot print (14) and the second (16) foot print having different dimensions,
    the at least one transmit antenna (13) being arranged to operate as a far field antenna and the at least one receive antenna (15) being arranged to operate as a near field antenna.

2. Ground penetrating radar system according to claim 1, characterised in that, the second foot print (16) is enclosed by the first foot print (14).

3. Ground penetrating radar system according to claim 1, characterised in that the at least one transmitter antenna (13) and the processing means (11,12) are arranged to provide a pulse shape with reduced ringing characteristics.

4. Ground penetrating radar system according to claim 1, characterised in that the at least one transmit antenna (13) is a TEM horn antenna.

5. Ground penetrating radar system according to claim 1, characterised in that the at least one transmit antenna (13) produces a single-cycle pulse of RF energy directed towards the ground surface (18).

6. Ground penetrating radar system according to claim 3, characterised in that the at least one transmit antenna (13) comprises a first and a second side wall (21, 22), attached to a connector (20) at a first end, the first and second side wall (21,22) being at a predetermined angle (a) to each other, the first and second side wall (21,22) each comprising a plurality of sections (24,25,26) with a predetermined length and a predetermined width, the predetermined width of at least one of the plurality of sections (24,25,26) tapering from the side nearest to the first end of the first and second side wall (21,22) towards the side nearest to a second end of the first and second side wall (21,22).

7. Ground penetrating radar system according to claim 1, characterised in that the at least one receive antenna (15) has a low sensitivity.

8. Ground penetrating radar system according to claim 7, characterised in that the at least one receive antenna (15) is one of the following types: a waveguide aperture antenna; a small loop antenna; a short dipole antenna; a $\lambda/10$-antenna.

9. Ground penetrating radar system according to claim 1, characterised in that the at least one receive antenna (15) comprises an additional receive antenna (19) with an additional receive antenna foot print (20) smaller than the transmit antenna foot print (14).

10. Ground penetrating radar system according to claim 1, characterised in that the at least one receive antenna (15) comprises an array (21) of receive antennae.

11. Ground penetrating radar system according to claim 1, characterised in that the at least one transmit antenna (13) and the at least one receive antenna (15) are attached to a moving platform.

12. Method for detecting an object on or below a ground surface, comprising the steps of:
    illuminating the ground surface with a wide band RF signal, the wide band RF signal being transmitted by a transmit antenna having a first foot print, and
    probing the wideband RF signals reflected by the object by at least one receive antenna (15) having a second foot print (16), the first (14) and second (16) foot prints having different dimensions,
    the transmit antenna (13) being operated in substantially a far field mode and the at least one receive antenna (15) being operated in substantially a near field mode.

13. Method according to claim 12, characterised in that the reflected wideband RF signals are probed by a linear array (21) of receive antennas.

14. Methods according to claim 12, characterized in that the wideband RF signal is transmitted substantially as a pulse shape with reduced ringing characteristics.

15. Methods according to claim 14, characterised in that the wideband RF signal is transmitted substantially as a single-cycle of RF energy.

16. Ground penetrating radar system for detecting objects on or below a ground surface, comprising:
    at least one transmit antenna array having a first foot print at the ground surface,
    at least one receive antenna array having a second foot print at the ground surface, and processing means connected to the at least one transmit antenna array and the at least one receive antenna array, the first foot print (14) and the second (16) foot print having different dimensions, the at least one transmit antenna array being arranged to operate as a far field antenna array and the at least one receive antenna array being arranged to operate as a near field antenna array.

* * * * *